United States Patent [19]

Hirakura et al.

[11] 4,266,141

[45] May 5, 1981

[54] TONER DEVELOPING ABILITY MEASURING SYSTEM FOR ELECTROSTATOGRAPHY

[75] Inventors: Koji Hirakura; Yasuo Sawada; Kenta Watase, all of Tokyo, Japan

[73] Assignee: Ricoh Company, Ltd., Tokyo, Japan

[21] Appl. No.: 57,882

[22] Filed: Jul. 16, 1979

[30] Foreign Application Priority Data

| | | | |
|---|---|---|---|
| Jul. 8, 1978 | [JP] | Japan | 53-83246 |
| Sep. 14, 1978 | [JP] | Japan | 53-113082 |
| Dec. 29, 1978 | [JP] | Japan | 53-182714[U] |
| Dec. 29, 1978 | [JP] | Japan | 53-182715[U] |
| Feb. 27, 1979 | [JP] | Japan | 54-24551[U] |

[51] Int. Cl.$^3$ ............ G01N 21/00

[52] U.S. Cl. ............ 250/564; 118/691

[58] Field of Search ............ 118/691; 250/564, 565, 250/573; 222/DIG. 1; 355/3 DD

[56] References Cited

U.S. PATENT DOCUMENTS

| | | | |
|---|---|---|---|
| 3,727,065 | 4/1973 | Maksymiak | 250/564 |
| 4,043,293 | 8/1977 | Ruckdeschel | 118/691 |
| 4,111,151 | 9/1978 | Ruckdeschel | 355/3 DD |

*Primary Examiner*—David C. Nelms

*Attorney, Agent, or Firm*—David G. Alexander

[57] ABSTRACT

A powdered developer (26) comprising carrier and toner particles is caused to flow by gravity downwardly through a passageway (71). A transparent electrode (62) is disposed in the passageway (71). A light source (64) and photosensor (66) are arranged on opposite sides of the electrode (62) for sensing an amount of attracted toner. The electrode (62) is first de-energized and cleaned by aprtially restricting the passageway (71) below the electrode (62) and allowing developer (26) to accumulate in the passageway (71) from the restriction upwardly past the electrode (62) while a restricted amount of developer (26) flows downwardly through the restriction. Then, the restriction is removed and the passageway (71) blocked above the electrode (62), allowing the accumulated developer (26) to flow downwardly past the electrode (62). Then, the passageway (71) is completely unblocked and the electrode (62) energized with an electric potential causing toner to be attracted thereto. After a predetermined length of time the passageway (71) above the electrode (62) is blocked and the output of the photosensor (66) indicates the amount of toner attracted to the electrode (62) and thereby the developing ability of the developer (26). The output of the photosensor (66) after cleaning the electrode (62) may be compared with the final output to provide a reference valve which is compensated for variables such as electrode contamination, electric potential variation and the like.

19 Claims, 29 Drawing Figures

TONER DEVELOPING ABILITY MEASURING SYSTEM FOR ELECTROSTATOGRAPHY

BACKGROUND OF THE INVENTION

The present invention relates to a method and apparatus for measuring the developing ability of a powdered developer for electrostatography. Typical applications are in electrostatic copying machines, electrostatic printers for computers and facsimile systems and the like.

In electrostatography an electrostatic image is formed on a dielectric material through photoconduction, electrostatic discharge or the like. A powdered or liquid developer is applied to the material and adheres to the areas of high electrostatic charge to form a toner image. The toner image is transferred and fixed to a copy sheet to provide a permanent reproduction. Alternatively, the toner image may be fixed to the material on which the electrostatic image is orginally formed.

A powdered developer generally comprises two components which are mixed together. The image is actually developed by toner particles of small size which are colored black or another suitable color. Magnetic or non-magnetic carrier particles are mixed with the toner particles to aid in application of the toner particles to the material carrying the electrostatic image.

The carrier particles are generally larger in size than the toner particles and are higher or lower in the triboelectric series than the toner particles. Agitation of the developer causes the carrier particles and toner particles to rub together and produce opposite electrostatic charges which cause the toner particles to adhere to the carrier particles and also to the electrostatic image on the material for development. The carrier particles are not consumed in the developing process, as are the toner particles, but are recovered and recycled.

The carrier particles which are recovered are mixed with the developer and used again in the developing process. However, since toner was consumed, the ratio of toner to carrier particles progressively decreases. For this reason, it is necessary to periodically add additional toner to maintain the toner to carrier ratio at the desired value. If this ratio drops significantly, the density of the developed image will drop by a corresponding amount. The ratio of toner to carrier particles in the developer is known in the art as the toner density.

However, factors other than toner density act to vary the developed image density. The amount of induced electrostatic charge in the developer, the shapes of the toner and carrier particles, the degree of adherence of the toner particles to the carrier particles, the amount of deteriorated carrier particles, the ambient temperature and humidity all act as variables to affect the image density.

The developing ability of a developer for electrostatography is thus the sum total of all variables including those enumerated above and may be defined as the amount of toner which adheres to an electrostatically charged surface of unit area and unit electrostatic charge. Due to deterioration of carrier particles, for example, the developing ability and thereby the image density may decrease even though the toner density remains constant or even increases.

Numerous methods have been proposed in the prior art for measuring the toner density and developing ability of a developer for electrostatography. Japanese patent publication No. 38-17245 teaches how to color toner and carrier particles with different colors and determine the toner density by sensing the relative color of the developer. A drawback is that the carrier particles must be colored, which is not practical in various systems.

Another prior art method is disclosed in Japanese patent publication No. 46-8280 in which a developer comprises ferromagnetic carrier particles and non-magnetic toner particles. The permeability of the developer is sensed by a coil and corresponds to the toner density. This method, however, cannot be applied to developers in which the carrier particles are nonmagnetic, such as developers for cascade development systems. In addition, these two methods measure the toner density, rather than the developing ability, and do not reflect the actual change in developing ability which takes place due to deterioration of carrier particles or variations in ambient temperature and humidity.

Another known method is disclosed in U.S. Pat. No. 3,399,652 in which developer is applied to a rotating metal disc and the amount of adhered toner is measured by means of a light source and photosensor which sense light reflected from the disc. An electric potential is applied to the disc to urge toner to adhere thereto. This method measures developing ability rather than toner density. However, it is disadvantageous since it requires a disc and motor for rotating the same. In addition, the results are unreliable since the photosensor and light source become contaminated with toner.

Another method is disclosed in U.S. Pat. No. 3,727,065 in which developer is caused to flow between two parallel transparent electrodes. An electric potential is applied across the electrodes which causes toner to adhere to one of the electrodes. A light source and photosensor measure the amount of light transmitted through the electrodes and thereby the amount of adhered toner which corresponds to the developing ability. The main problem with this system is that it is impossible to base the measurement on a reference level which occurs when the electrodes are completely free of toner. The reference level varies as the result in changes of the amount of contamination of the electrodes with residual toner or dirt, variations in the output of the light source and voltage source for the electrodes, temperature variations of electrical components and the like. Although the potential is periodically reversed so that one electrode is cleaned while toner adheres to the other electrode, the reference level cannot be measured since toner always adheres to one or the other of the electrodes.

Another problem in the last described method is that the accumulation of toner on the electrodes tends to become excessive and a powerful light source and sensitive photosensor are reqiured to measure the toner accumulation. The result is high production cost and power requirements in addition to a generally inaccurate measurement. In addition, the uniform electric field across the electrodes does not accurately simulate electrostatic reproduction of printed documents since the relatively this lines making up the characters create uneven electric fields.

An improved apparatus is disclosed in Japanese patent publication No. 50-8941 which comprises an additional photosensor and light source for measuring transmitted light through electrodes which are not energized with electric potential and used for the developing ability measurement. Although this method provides a reference level, the reference level is not accurate due to differences in the electrical characteristics of the photosensors and light sources and since it cannot measure the amount of residual toner which remains on the measurement electrodes after the cleaning step.

Another method is disclosed in Japanese patent publication No. 52-13935 which uses a chopper wheel to alternatingly uncover a reference density surface and a surface on which toner has adhered and direct light transmitted therefrom to photosensors which produce A.C. output signals. A smiilar apparatus is disclosed in Japanese patent publication No. 52-33734 which uses a single photosensor and means for storing a signal corresponding to reflected light from the reference density surface or toner adhered surface for comparison. Both of these methods involve relatively expensive mechanical components and provide results of insufficient accuracy.

Yet another prior art method is disclosed in Japanese patent publication No. 48-95243 in which developer is caused to fall onto and flow down an inclined transparent plate. A light source and photosensor measure the amount of toner which accumulates on the plate. This method is inaccurate in that it does not measure the actual developing ability and the toner tends to melt and stick to the plate, thereby further degenerating the accuracy of the reading.

Two color copying machines have been introduced for business applications. Typically, such a copying machine will produce copies in black and red, the most common colors used in business documents. Debit entries are made in accounting ledgers in red whereas credit entries are made in black. In addition, important parts of documents are often underlined in red.

In a two color copying machine a bipolar electrostatic image is formed corresponding in polarity to the two colors, and black and red toners of opposite electrostatic polarity are applied to the image for development. The toners may be applied separately or as a mixture. In the latter case, it is necessary to measure the developing ability of the toners separately since the black toner is consumed faster than the red toner. This is because most printing is in black. No methods proposed heretofore are capable of independently measuring the developing abilities of two toners mixed together with a carrier to constitute a two color, three component developer.

SUMMARY OF THE INVENTION

An apparatus embodying the present invention for sensing a developing ability of a powdered developer for electrostatography includes an upstanding passageway through which the developer is caused to flow by gravity, attraction means disposed in the passageway for attracting the developer to the attraction means and sensor means for sensing an amount of developer attracted to the attraction means. Aperture means disposed in the passageway below the attraction means define a restricted aperture, and control means control the valve means to alternatingly open to allow developer to accumulate in the passageway from the aperture means upwardly above the attraction means while a restricted amount of developer flows downwardly through the aperture means; and close to allow the accumulated developer to flow downwardly below the attraction means; the control means controlling the sensor means to sense the amount of developer attracted to the attraction means after the accumulated developer has flowed downwardly below the attraction means.

In accordance with the present invention, a powdered developer comprising carrier and toner particles is caused to flow by gravity downwardly through a passageway. A transparent electrode is disposed in the passageway. A light source and photosensor are arranged on opposite sides of the electrode for sensing an amount of attracted toner. The electrode is first de-energized and cleaned by partially restricting the passageway below the electrode and allowing developer to accumulate in the passageway from the restriction upwardly past the electrode while a restricted amount of developer flows downwardly through the restriction. Then, the restriction is removed and the passageway blocked above the electrode, allowing the accumulated developer to flow downwardly past the electrode. Then, the passageway is completely unblocked and the electrode energized with an electric potential causing toner to be attracted thereto. After a predetermined length of time the passageway above the electrode is blocked and the output of the photosensor indicates the amount of toner attracted to the electrode and thereby the developing ability of the developer. The output of the photosensor after cleaning the electrode may be compared with the final output to provide a reference value which is compensated for variables such as electrode contamination, electric potential variation and the like.

It is an object of the present invention to provide a method of measuring the developing ability of a developer for electrostatography which overcomes the drawbacks of the prior art and is practical and accurate.

It is another object of the present invention to provide an apparatus embodying the method.

It is another object of the present invention to provide a method of measuring the developing ability of a powdered two component developer which ensures that a proper amount of toner is added to the developer to maintain the copy density at a desired value.

It is another object of the present invention to provide a method of measuring the developing ability of a developer which allows the developing ability of two toner components to be measured separately.

It is another object of the present invention to provide a generally improved method and apparatus for measuring the developing ability of a developer for electrostatography.

Other objects, together with the foregoing, are attained in the embodiments described in the following description and illustrated in the accompanying drawing.

DESCRIPTION OF THE PREFERRED EMBODIMENTS

While the developing ability measuring method and apparatus of the present invention are susceptible of numerous physical embodiments, depending upon the environment and requirements of use, substantial numbers of the herein shown and described embodiments have been made, tested and used, and all have performed in an eminently satisfactory manner.

Figure 1:
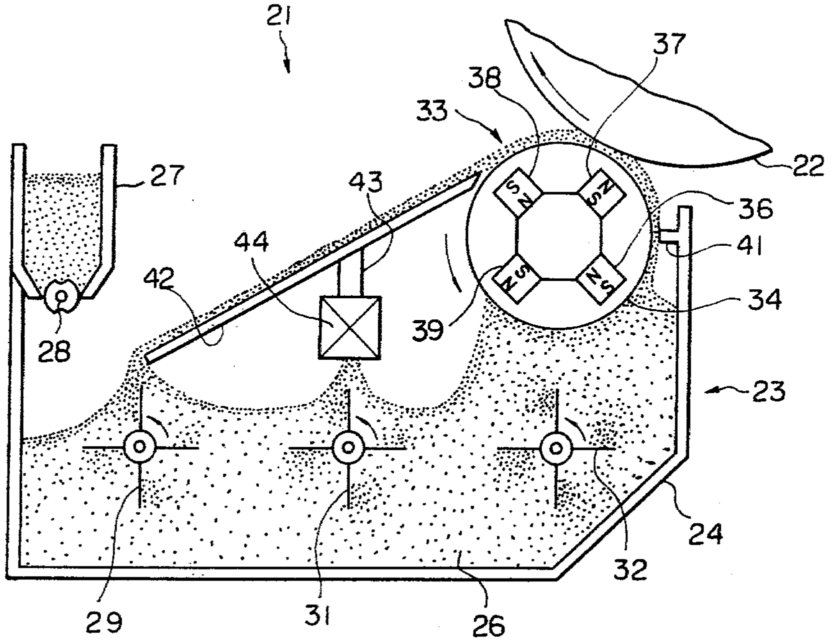
FIG. 1 is a schematic diagram of a developing system for electrostatography comprising an apparatus embodying the present invention for measuring the developing ability of a two component developer.

Referring now to FIG. 1 of the drawing, a developing system for electrostatography is generally designated by the reference numeral 21 and comprises a photoconductive drum 22 which is rotated clockwise at constant speed. Although not illustrated, the drum 22 is electrostatically charged and a light image of an original document focussed thereon to form an electrostatic image through localized photoconduction. A developing unit 23 applies a powdered developer to the drum 22 to form a toner image which is transferred and fixed to a copy sheet to provide a permanent reproduction of the original document.

The developing unit 23 comprises a developing tank 24 disposed below the drum 22 for containing a powdered developer. The developer is designated as 26 and comprises ferromagnetic carrier particles and non-magnetic, black colored toner particles. The carrier and toner particles differ from each other in the triboelectric series so that friction therebetween induces opposite electrostatic charges thereon. As illustrated, the toner particles become positively charged whereas the carrier particles become negatively charged. The polarity of the electrostatic image on the drum 22 is negative, so as to attract the positively charged toner particles.

Toner is provided in a hopper 27. When required, an electromagnetic solenoid (not shown) is energized to rotate a notched cylinder 28 and allow a predetermined amount of toner to fall from the hopper 27 into the tank 24. Impellers 29, 31 and 32 serve the function of moving the developer 26 rightwardly toward a magnetic brush unit 33, mixing the added toner with the developer 26 in the tank 24 and generating friction for triboelectrically charging the carrier and toner particles.

The magnetic brush unit 33 comprises a non-magnetic cylindrical sleeve 34 which is rotated counterclockwise at constant speed in close proximity to the drum 22. Magnets 36, 37, 38 and 39 attract the developer 26 to the sleeve 34 to form a magnetic brush which is carried by the sleeve 34 into brushing contact with the drum 22. Toner is attracted to the high potential areas on the drum 22 while the carrier particles remain on the sleeve 34. A doctor blade 41 limits the thickness of the magnetic brush to a predetermined optimum value.

After application to the drum 22, the carrier particles and remaining toner particles are scrapingly removed from the sleeve 34 by an inclined plate 42, and slide down the plate 42 into the tank 24 for recycling. A portion of the carrier and toner on the plate 42 drop through a hole (not visible) in the plate 42 and a tube 43 through a developing ability sensor 44 embodying the present invention and therefrom into the tank 24. Although the sensor 44 is shown as measuring the developing ability of developer after application to the drum 22, it may be adapted within the scope of the present invention to measure the developing ability of the developer 26 in the tank 24 before application to the drum 22.

Figure 2:
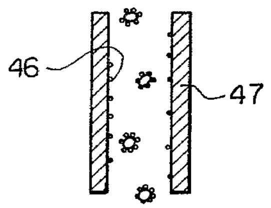
FIGS. 2 to 5 are schematic diagrams of electrode assemblies usable in the present apparatus.

FIGS. 2 to 5 illustrate various attraction means which may be used as component elements in the sensor 44. In FIG. 2, two parallel vertically oriented transparent electrodes 46 and 47 are disposed so that the developer is caused to flow downwardly therebetween by gravity. This arrangement is usable where the developer comprises carrier and toner particles which are easily separated from each other, such as developers for cascade development where the carrier particles are non-magnetic. The toner particles adhere to the electrodes 46 and 47 due to induced electrostatic charge while the larger and heavier carrier particles fall downwardly without adhering to the electrodes 46 and 47. Typically, the electrodes 46 and 47 may be made of a commercially available material such as NESA glass.

Figure 3:
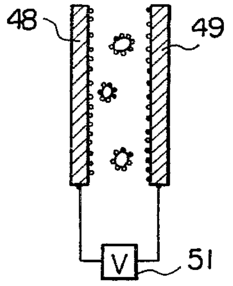

FIG. 3 illustrates another arrangement comprising transparent electrodes 48 and 49 and a power source 51 for applying an electric potential across the electrodes 48 and 49. The source 51 may be D.C., in which case the toner particles adhere to only one of the electrodes 48 and 49. Alternatively, the source 51 may be A.C., in which case toner adheres to both electrodes 48 and 49 due to induced charge. The arrangement of FIG. 3 is operative with frequencies below 500 Hz. Good results are obtained with commercial power line frequencies of 50 Hz and 60 Hz. An advantage of A.C. is that both electrodes 48 and 49 are used in an even manner. As an alternative, the source 51 may be D.C., and the output connections reversed periodically so that one electrode 48 or 49 is used while the other electrode 48 or 49 is cleaned.

Figure 4:
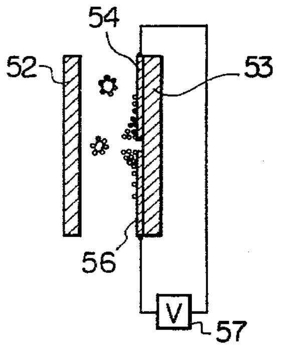

FIG. 4 illustrates another arrangement comprising two transparent plates 52 and 53. Vertically spaced transparent electrodes 54 and 56 are fixed to the plate 53 and a power source 57 applies an electric potential across the electrodes 54 and 56. The advantage of the arrangement of FIG. 4 is that toner is attracted to the adjacent portions of the electrodes 54 and 56 in an uneven manner which simulates an electrostatic image of a printed document.

Figure 5:
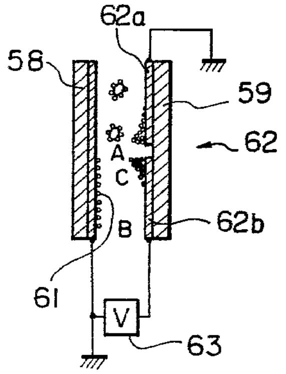

FIG. 5 illustrates a most preferred arrangement comprising transparent plates 58 and 59. A first transparent electrode 61 is fixed to the plate 58. A second transparent electrode 62 is fixed to the plate 59. The electrode 62 comprises first and second vertically spaced, electrically separate sections 62*a* and 62*b*. One end of a D.C. power source 63 is connected to the electrode 61 and to the section 62*a* of the electrode 62. The other end of the power source 63 is connected to the section 62*b* of the electrode 62.

Figure 7:
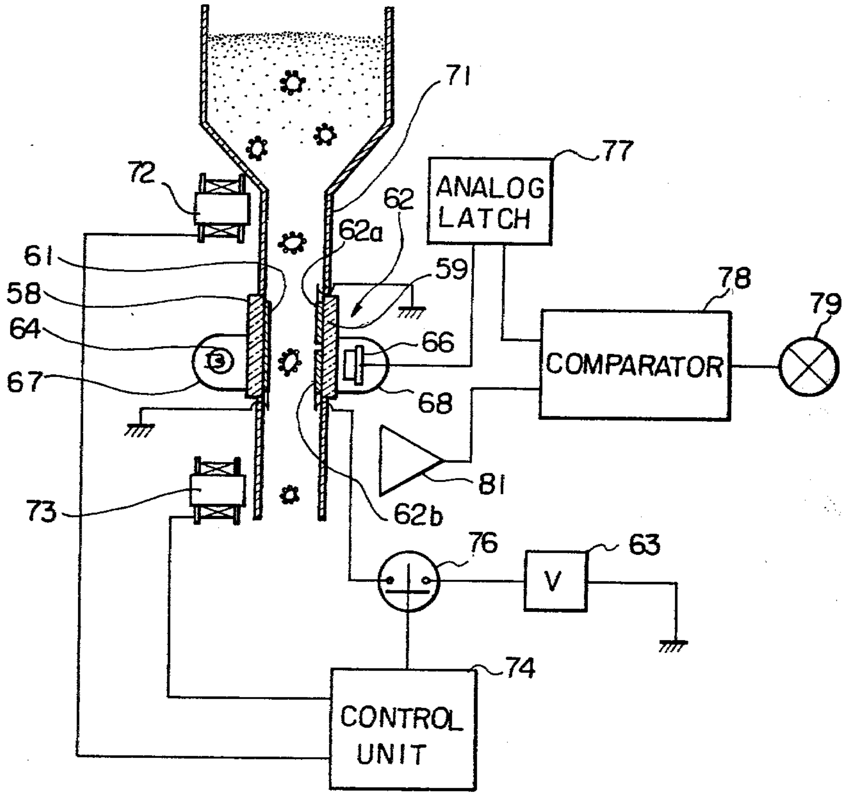
FIG. 7 is a schematic diagram of an apparatus embodying the present invention for measuring the developing ability of a powdered developer.

Referring also to FIG. 7, a light source 64 and a photosensor 66 are arranged on opposite sides of the plates 58 and 59 so that light from the source 64 passes perpendicularly through the electrode 61 and section 62*b* and is incident on the photosensor 66. The amount of toner accumulated on the electrodes 61 and 62 corresponds to the developing ability of the developer 26.

Figure 6:
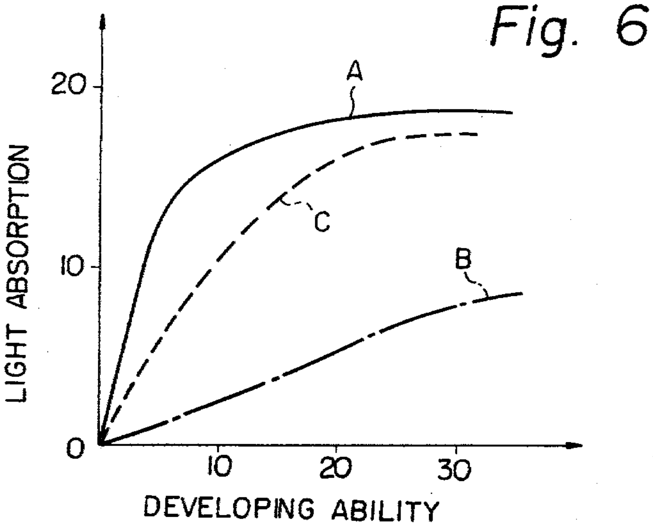
FIG. 6 is a graph illustrating the operation of the electrode assembly of FIG. 5.

Referring also to FIG. 6, the horizontal axis represents the relative developing ability of the developer 26 and the vertical axis represents the amount of light from the light source 64 absorbed by the toner on the electrodes 61 and 62. Conversely, the vertical axis may be considered as representing the reciprocal of the amount of light incident on the photosensor 66.

The toner accumulation or amount of adhered toner is large in an area A in which the sections 62*a* and 62*b* are adjacent. The toner accumulation is minimum in an area B, and is also uniform, simulating a large dark area in a reproduced image. In an area C, between the areas A and B, the toner accumulation is non-uniform, simulating a line image area in a printed document.

As shown in FIG. 6, the light absorption in the area A increases steeply with developing ability and soon saturates. In the area B, the light absorption increases gradually in a generally linear manner. In the area C, the light absorption is intermediate between that in the areas A and B. The area C is generally the most desirable for measuring the developing ability. However, it is difficult to precisely position the light source 64 and photosensor 66 to provide optimum accuracy. For this reason, the light source 64 and 66 are made large enough to measure the average light absorption and thereby the developing ability in all of the areas A, B and C. Protective covers 67 and 68 are provided to hermetically seal the light source 64 and photosensor 66 in conjunction with plates 58 and 59 respectively and protect the source 64 and photosensor 66 from contamination by loose toner particles and dirt which would degrade the accuracy of the apparatus 44. Generally, the area B simulates a large dark area in a photographic document whereas the area C simulates a line area in a printed document. Thus, the output of the photosensor 66 is an average value constituting a compromise between the two types of documents which are copied.

The arrangement of FIG. 5 functions to measure the developing ability of the developer 26 since the electrodes 61 and 62 simulate an electrostatic image and the amount of toner which adheres to the electrodes 61 and 62 corresponds to the developing ability. When the developing ability decreases, the apparatus 44 actuates the cylinder 28 to add more toner to the developer 26 until the developing ability is restored to a predetermined optimum value.

However, the apparatus 44 described thus far suffers from a drawback in that continuous operation causes an excessive amount of toner to accumulate on the electrodes 61 and 62. An equilibrium value is reached when the attractive electric potential on the electrodes 61 and 62 is balanced by the weight of the toner and the abrasive effect of the developer 26 falling through the apparatus 44. The equilibrium amount of toner is generally quite large, and the absorption of light is excessive. This produces inaccurate measurement, even with a powerful light source and sensitive photosensor. The problem is compounded by the fact that a certain amount of toner adheres to the electrodes 61 and 62 even if an electric potential is applied which repels the toner away from the electrodes 61 and 62 for cleaning. The amount of residual toner is unpredictable, and seriously degrades the accuracy of the measurement. An electric potential is insufficient to satisfactorily clean the electrodes. Resort may be made to a mechanical cleaning member such as a scraper, but this involves additional and unwarranted production cost and complexity and may damage the surfaces of the electrodes 61 and 62, causing the results of the measurement to become erratic.

These problems are overcome in the apparatus 44 as will be fully understood from further description. As shown in FIG. 7, the developer 26 is caused to flow down a passageway or conduit 71. The plates 58 and 59 constitute a portion of the wall of the conduit 71. An electromagnetic coil 72 which functions as a valve is disposed adjacent to the conduit 72 above the plates 58 and 59. Another electromagnetic coil 73 which functions as a means for defining a restricted aperture is disposed adjacent to the conduit 71 below the plates 58 and 59. The coils 72 and 73 are energized from the power source 63 through a switch 76 and a control unit 74.

The output of the photosensor 66 is applied through an analog latch 77 to a comparator 78. The output of the comparator 78 is connected to an electromagnetic solenoid 79 which actuates the cylinder 28. The output of a reference source 81 is also connected to the comparator 78.

Figure 8:
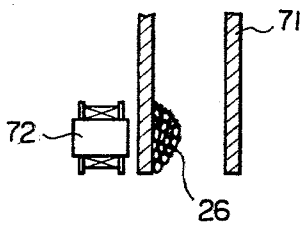
FIG. 8 is an enlarged view illustrating the operation of a valve means of the apparatus.
Figure 9A:
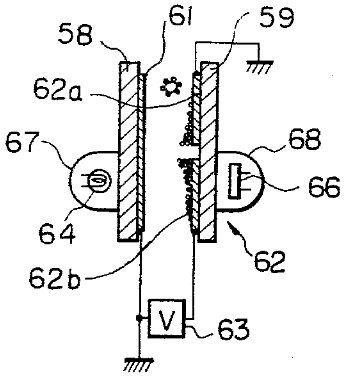
FIGS. 9a to 9d are diagrams illustrating the steps of operation of the apparatus of FIG. 7.
Figure 9B:
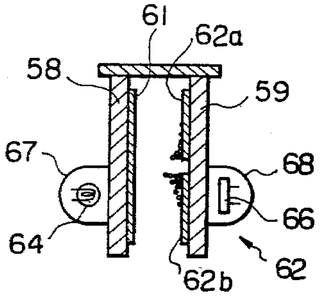

The operation of the apparatus 44 will now be described with reference also being made to FIGS. 9*a* to 9*d*. In the step of FIG. 9*a*, the control unit 74 de-energizes both coils 72 and 73 and energizes the electrodes 61 and 62. Thus, developer 26 is allowed to flow freely downwardly through the conduit 71 for a predetermined length of time and toner is allowed to adhere to the electrodes 61 and 62. Then, the coil 72 is energized by the control unit 74 to block the conduit 71 as shown in FIG. 9*b*. As illustrated in FIG. 8, the coil 72 produces an electromagnetic field which attracts developer and causes it to adhere to the wall of the conduit 71. When sufficient developer has accumulated, it will choke off or block the conduit 71.

When a predetermined length of time has elapsed to allow the flow of developer 26 through the conduit 71 to be completely stopped, the output of the photosensor 66 is latched into the latch 77. This output corresponds to the developing ability of the developer 26.

Figure 9C:
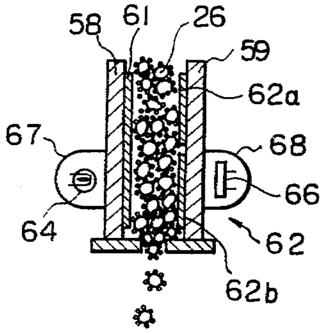

Next, as shown in FIG. 9*c*, the coil 72 is de-energized and the coil 73 energized. The coil 73 is smaller or weaker than the coil 72 so that even with full voltage applied to the coil 73, the electromagnetic field thereof will be insufficient to completely block the conduit 71. Instead, the conduit 71 will be partially blocked, defining a restricted aperture.

Figure 9D:
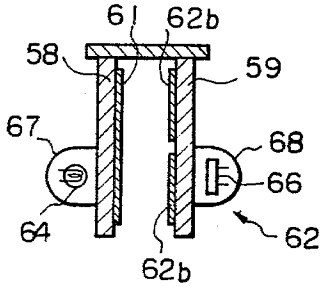

The restriction created by the coil 73 is sufficient to allow developer to accumulate in the conduit 71 from the coil 73 upwardly above the plates 58 and 59 while a restricted amount of developer 26 flows downwardly through the restricted aperture. During this step, the electrodes 61 and 62 are completely de-energized. In accordance with an important feature of the present invention, the filling of the conduit 71 and the flow through the restricted aperture produced by the coil 73 create frictional abrasion which gently but completely cleans toner from the electrodes 61 and 62. After a predetermined length of time has passed to enable the electrodes 61 and 62 to be cleaned completely, the coil 72 is energized and the coil 73 de-energized. As illustrated in FIG. 9*d*, all developer 26 flows downwardly out of the conduit 71 below the coil 72. At this time, the output of the photosensor 66 is applied to the analog latch 77. The output of the photosensor 66 after cleaning of the electrodes 61 and 62 constitutes a reference value which compensates for contamination of the electrodes 61 and 62 and plates 58 and 59, variations in the output of the light source 64 and electrical characteristics of the photosensor 66 and other related variables. The latch 77 is constructed to produce an output which is a predetermined function of the difference between the output of the photosensor 66 in the steps of FIGS. 9*b* and 9*d*.

The output of the latch 77 is applied to the comparator 78 and compared with the output of the reference source 81. The output of the reference source 81 corresponds to a reference developing ability below which additional toner should be added to the developer 26. If the output of the latch 77 is below the reference value, the solenoid 79 is actuated to add more toner from the hopper 27 into the tank 24.

The passageway 71 is blocked above the electrodes 61 and 62 in steps 9*b* and 9*c* to eliminate noise caused by falling developer from the output of the photosensor 66. The steps of FIGS. 9*a* to 9*d* are performed continuously, with the step of FIG. 9*a* being repeated after completion of the step of FIG. 9*b*. It is also fully within the scope of the present invention to start with the step of FIG. 9*c* rather than the step of FIG. 9*a*. In this case, the electrodes 61 and 62 are first cleaned, the output of the photosensor 66 following the cleaning step latched into the latch 77, the toner allowed to accumulate or adhere to the electrodes 61 and 62 and the density of the accumulated toner sensed and subtractively combined with the latched value for comparison with the reference value from the source 81.

The apparatus 44 may be adapted to measure the developing ability of developers comprising non-magnetic carrier particles as used in cascade development. In such a case, the coils 72 and 73 will be replaced by a mechanical valve and aperture means respectively.

Figure 10:
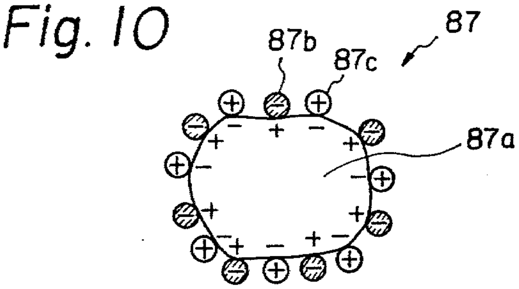
FIG. 10 is a diagram illustrating a three component developer for two color electrostatography.

FIG. 10 illustrates a three component developer for two color electrostatography. The developer is generally designated as 87 and comprises carrier particles 87*a*, black toner particles 87*b* and red toner particles 87*c*. The black toner particles 87*b* are lower in the triboelectric series than the carrier particles 87*a*. The red toner particles 87*c* are higher in the triboelectric series than the carrier particles 87*a*. Frictional forces in the developer 87 cause the black toner particles 87*b* to become negatively charged and the red toner particles 87*c* to become positively charged relative to the carrier particles 87*a* and adhere to the carrier particles 87*a*.

Figure 11:
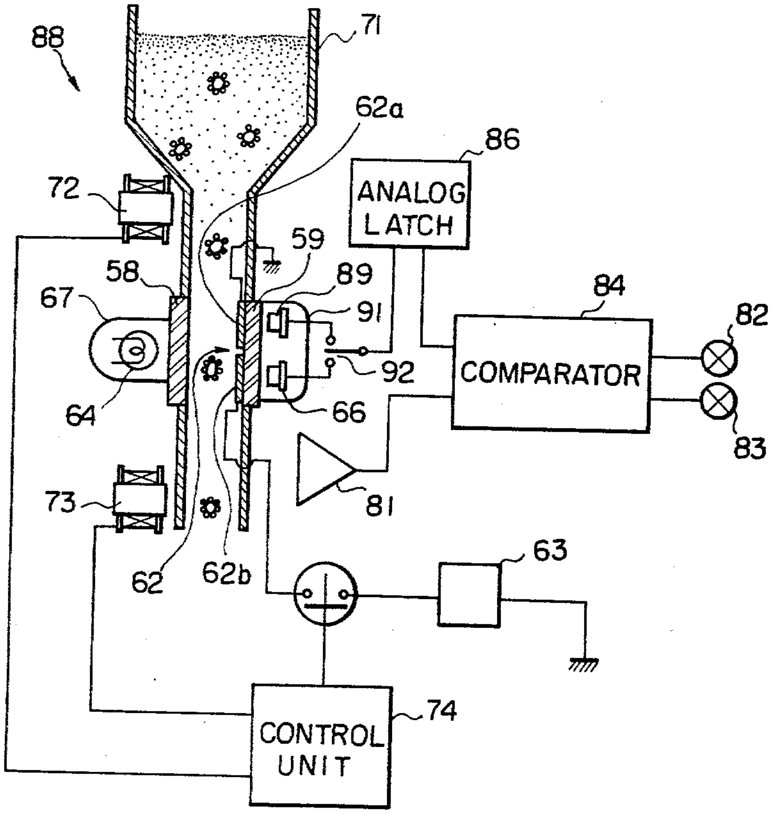
FIG. 11 is a schematic diagram of a modified apparatus embodying the present invention for measuring the developing ability of both toner components of the three component developer.

A modified apparatus 88 for measuring the developing ability of the developer 87 is illustrated in FIG. 11, with like elements being designated by the same reference numerals. The steps of the process are illustrated in FIG. 12*a* to 12*d*.

The apparatus 88 differs from the apparatus 44 in that the electrode 61 is omitted. In addition, another photosensor 89 is provided in a cover 91 facing the electrode section 62*a*. The outputs of the photosensors 66 and 89 are selectively applied to an analog latch 86 through a changeover switch 92. The output of the latch 86 is connected to a comparator 84. The output of the comparator 84 is connected to solenoids 82 and 83 which, when energized, cause black and red toner to be added to the developer 87 respectively.

Figure 12A:
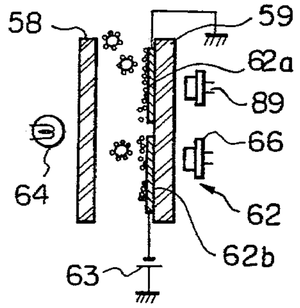
FIGS. 12a to 12d are diagrams illustrating the steps of operation of the apparatus of FIG. 11.
Figure 12B:
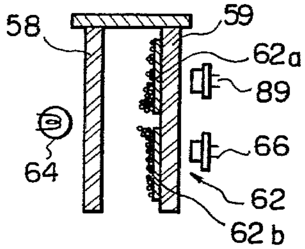
Figure 12C:
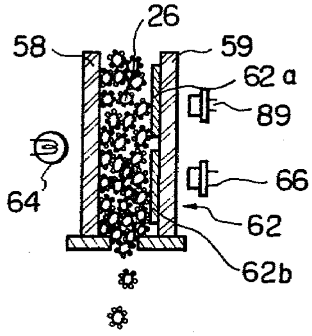

In the first step of FIG. 12*a*, due to the fact that the sections 62*a* and 62*b* are connected to opposite ends of the power source 63, black toner particles 87*b* adhere to the section 62*a* whereas red toner particles 87*c* adhere to the section 62*b*. The ground reference is arbitrary and shown as being connected to the positive end of the source 63. First, the switch 92 is changed over to connect the output of the photosensor 66 to the input of the latch 86. After this action, the steps of FIG. 12*a* to 12*d* are performed which correspond to the steps of FIGS. 9*a* to 9*d*. The solenoid 83 is controlled in accordance with the results of the measurement of sensing operation to add additional black toner if required.

Figure 12D:
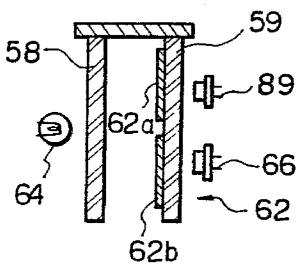

Then, the switch 92 is changed over to connect the output of the photosensor 89 to the input of the latch 86. The steps of FIGS. 12*a* to 12*d* are then performed to measure the developing ability of the red toner and control the solenoid 82 in accordance with the result thereof. The steps of FIGS. 12*a* and 12*d* are alternatingly performed to measure the developing ability of the black toner and the developing ability of the red toner by means of the changeover switch 92.

As an alternative, the latch 86, comparator 84 and source 81 may be adapted to comprise double units operating on the red and black toner measurements in a parallel manner and simultaneous. In such a case, the switch 92 may be eliminated. Thus, the outputs of the photosensors 66 and 89 would be operated on in parallel in the steps of FIGS. 12*a* and 12*d*. As yet another alternative, the switch 92 may be provided and changed over to sequentially gate outputs of the photosensors 66 and 89 to the latch 86 in the steps of FIGS. 12*a* and 12*d* for parallel operation thereafter.

Figure 13:
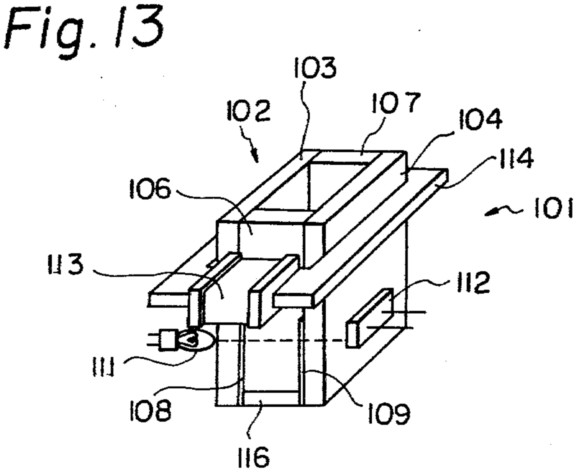
FIG. 13 is a perspective view of an electrode assembly usable in the present apparatus.
Figure 14:
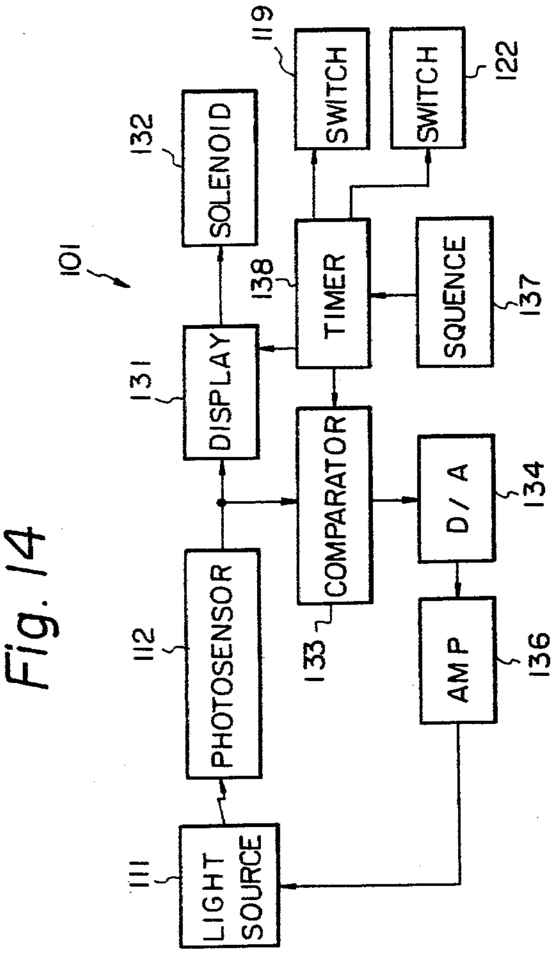
FIG. 14 is a block diagram illustrating a modified method of operation of the present apparatus.
Figure 16:
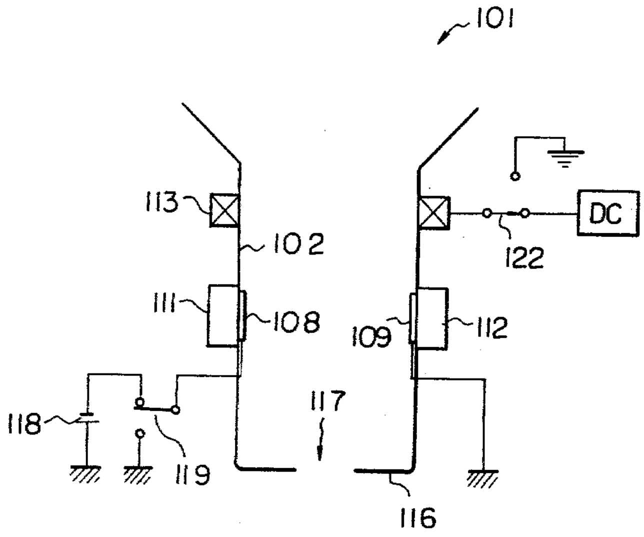
FIG. 16 is a schematic diagram of a modified apparatus embodying the present invention.

FIGS. 13, 14 and 16 illustrate the mechanical configuration of another apparatus 101 embodying the present invention. The apparatus 101 comprises a conduit 102 through which developer is caused to flow downwardly by gravity. The conduit 102 comprises two parallel upstanding transparent plates 103 and 104 which are separated by spacers 106 and 107. Transparent electrodes 108 and 109 are fixed to the inner surfaces of the plates 103 and 104 respectively. A light source 111 constituted by a miniature bulb is disposed adjacent to the plate 108. A photosensor 112 is disposed adjacent to the plate 104. An electromagnetic coil 113 is disposed adjacent to the spacer 106. An annular core 114 of the coil 113 surrounds the conduit 102. As best seen FIG. 16, an aperture plate 116 is disposed in the conduit 102 below the electrodes 108 and 109 to define a restricted aperture 117. The electrode 104 is connected to the positive end of a D.C. power source 118. The electrode 108 is selectively connectable to the positive and negative ends of the source 118 through a switch 119. The ground connection is arbitrary, and illustrated as being connected to the positive end of the source 118. The coil 113 is selectively connectable to a D.C. power source 121 and ground through a switch 122. The sources 118 and 121 may be integral, although illustrated as being separate.

The miniature lamp 111 is a good and economical light source but the output thereof tends to be unstable, especially changing by a substantial amount over a period of use. Without the novel arrangement of the present invention which will be described in detail below, the variation in output of the lamp 111 would render the measurement of the developing ability inaccurate.

As shown in FIG. 14, the output of the photosensor 112 is connected to a display unit 131 for display of the developing ability in analog or digital form and also to a solenoid for adding toner when the developing ability drops below a predetermined value. The output of the photosensor 112 is also connected to a comparator 133 which compares the output of the photosensor 112 with a reference value. The output of the comparator 133 is connected through a digital to analog converter 134 to an amplifier 136 which energizes the lamp 111.

A sequence unit 137 controls a timer 138 which functions to control the operation of the other units of the apparatus 101.

The operation of the apparatus 101 is as follows. In response to a start signal from the sequence unit 137, the timer 138 de-energizes the coil 113 through the switch 122 and further de-energizes the electrodes 108 and 109 through the switch 119 by connecting these elements to ground. The timer 138 maintains these connections for a predetermined length of time to allow the developer to accumulate in the conduit 102 from the aperture 117 upwardly above the electrodes 108 and 109. During this operation a restricted amount of developer flows downwardly through the aperture 117. This serves the function of cleaning the electrodes 108 and 109 through friction by means of the flow of developer.

After a predetermined length of time has elapsed sufficient for the electrodes 108 and 109 to be well cleaned, the timer 138 controls the switch 122 to connect the coil 113 to the source 121. The coil 113 causes the developer to accumulate and block the conduit 102 in the manner described above. Then, the timer 138 controls the comparator 133 to compare the output of the photosensor 112 with the reference value.

The output of the comparator 133 is fed through the converter 134 to the amplifier 136. The comparator 133 is constructed in such a manner so as to produce an output signal which corresponds to the difference between the output of the photosensor 112 and the reference value but is opposite in polarity. This causes the output of the amplifier 136 to change in such a manner as to energize the lamp 111 with a voltage to adjust the output of the photosensor 112 to be equal to the reference value. In other words, the light source 111, photosensor 112, comparator 133, coverter 134 and amplifier 136 constitute a closed loop feedback system which adjusts the voltage of the lamp 111 so that the output of the photosensor 112 always equals the reference value. This automatically compensates for variations in the characteristics of the lamp 111, contamination of the electrodes 108 and 109 and all other variables and provides a reference level for the measurement of the developing ability which stable and accurate.

After adjusting the lamp 111 to provide the reference value, the coil 113 is de-energized to allow developer to flow past the electrodes 108 and 109, and the electrodes 108 and 109 are energized through the switch 119. The developer may be allowed to accumulate above the level of the electrodes 108 and 109 after which time the coil 113 is energized to stop the flow. After sufficient time has elapsed for the developer to flow down below the electrodes 108 and 109, the output of the photosensor 112 is applied to the display unit 131 and to the solenoid 132 if the developing ability has dropped below the predetermined value for adding more toner.

Alternatively, the coil 113 may be energized to stop the flow of developer before the developer has accumulated up to the level of the electrodes 108 and 109. In this case, the amount of toner adhered to the electrodes 108 and 109 will be greater than if the developer where allowed to accumulate above the electrodes 108 and 109 due to absence of the frictional cleaning force, and provides a more accurate measurement.

Figure 15:
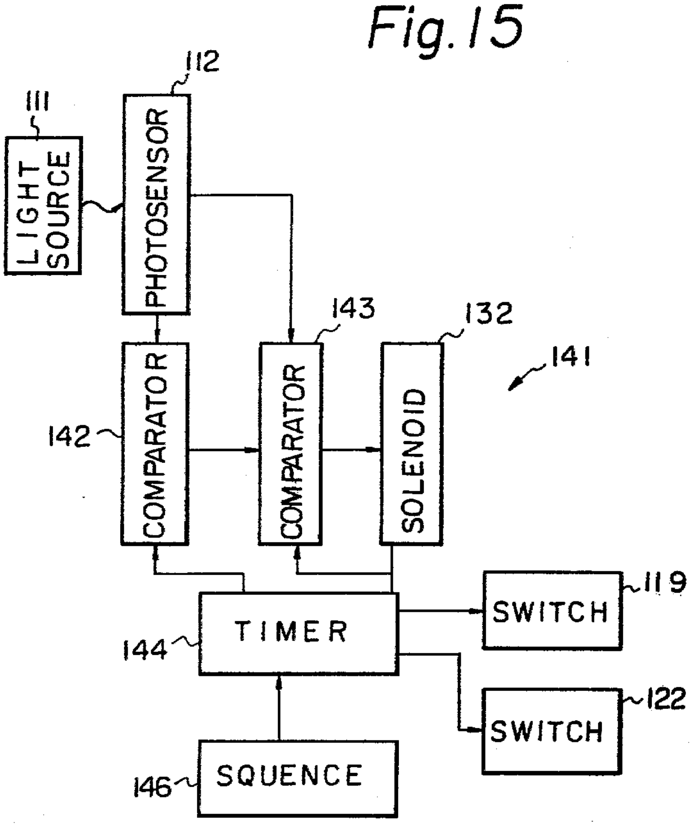
FIG. 15 is similar to FIG. 14 but shows another modified mode of operation.

FIG. 15 illustrates another embodiment of the present invention which is generally designated as 141. Like elements are designated by the same reference numerals used in FIG. 14.

The apparatus 141 is useful in a case where it is not desirable to vary the voltage applied to the light source 111. The output of the photosensor 112 is connected to inputs of comparators 142 and 143. The output of the comparator 142 is connected to another input of the comparator 143. The output of the comparator 143 is connected to control the solenoid 132. A timer 144 controls the various units under the supervision of a sequence unit 146.

In the apparatus 141 there is no means for regulating the voltage applied to the light source 111. However, after the cleansing step, the comparator 142 compares the output of the photosensor 112 with a predetermined reference value which corresponds to normal operation of the apparatus 141. The comparator 142 produces an output signal which is a predetermined function of the difference between the output of the photosensor 112 and the reference signal. The output of the comparator 142 constitutes a correction signal for varying or correcting the output of the photosensor 112 to compensate for variations in the output of the lamp 111, etc. In other words, after the electrodes 108 and 109 are energized to accumulate toner thereon in an amount corresponding to the developing ability of the developer, the corresponding output signal of the photosensor 112 is combined with the output of the comparator 142 so that the output of the comparator 143 is constituted by the output of the photosensor 112 adjusted or corrected by the correction signal from the comparator 142 for such factors as variation in the output of the lamp 111. Thus, the output of the comparator 143 is independent of such variations and corresponds to the actual developing ability of the developer. The operation is otherwise the same as described with reference to FIG. 14.

Figure 17A:
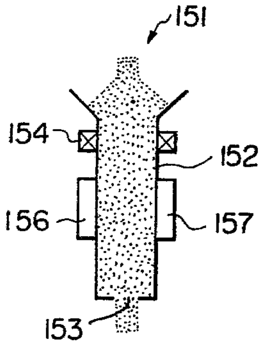
FIGS. 17a to 17c are diagrams illustrating another method of the present invention.
Figure 17B:
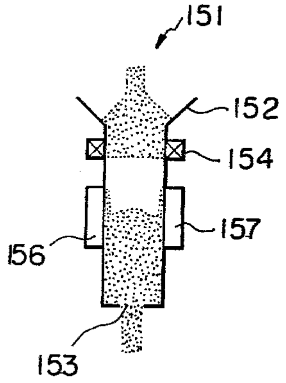
Figure 17C:
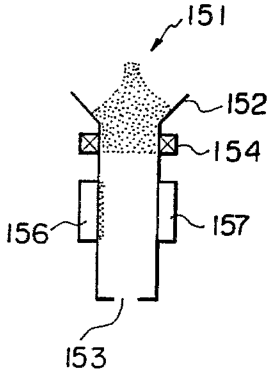

FIGS. 17*a* to 17*c* illustrate a simplified embodiment of the present invention which is designated as 151. The apparatus 151 comprises a conduit 152, a restricted aperture means 153, a coil 154, electrodes 156 and 157 and a light source and photosensor which are not shown along with the various control means.

In the first step of FIG. 17*a*, the coil 154 and electrodes 156 and 157 are de-energized to allow the developer to fill the conduit 152 above the electrodes 156 and 157 and clean the same. Then, the electrodes 156 and 157 are energized to attract toner.

In the next step of FIG. 17*b* the coil 154 is energized to stop the flow of developer. A certain amount of toner remains adhered to the electrode 156 which corresponds to the polarity of the toner and the developing ability of the developer. In the final step of FIG. 17*c* the amount of adhered toner is measured to determine the developing ability.

Another apparatus 161 embodying the present invention is shown in FIGS. 18*a* to 18*d* in which like elements are designated by the same reference numerals used in FIGS. 17*a* to 17*c*.

Figure 18A:
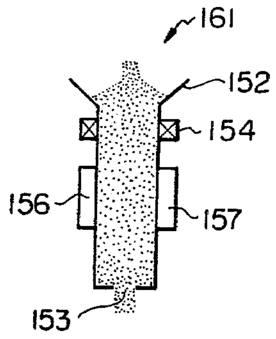
FIGS. 18a to 18d are diagrams illustrating yet another method of the present invention.
Figure 18B:
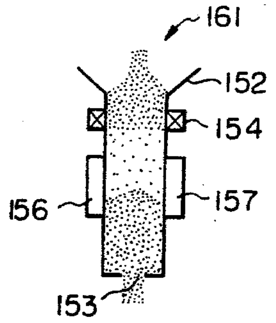

In the first step of FIG. 18*a*, the coil 154 and electrodes 156 and 157 are de-energized for cleaning the electrodes 156 and 157. In the step of FIG. 18*b*, the electrodes 156 and 157 are still de-energized but the coil 154 is energized with a voltage such as to partially block the conduit 152. This may be accomplished by applying a D.C. voltage to the coil 154 which is insufficient to attract enough developer to completely choke the conduit 152. Alternatively, the coil 154 may be energized with an A.C. voltage of suitable magnitude to partially block the conduit 152.

Figure 18C:
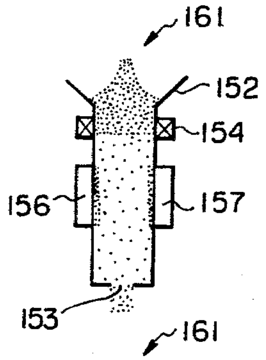
Figure 18D:
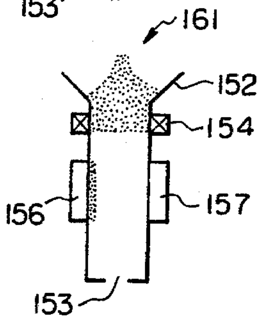

After the accumulated developer has flowed downwardly past the level of the electrodes 156 and 157, the electrodes 156 and 157 are energized in the step of FIG. 18*c*. After sufficient time has elapsed to enable an amount of toner to accumulate on the electrode 156 to give an indication of the developing ability, the step of FIG. 18*d* is performed in which a D.C. voltage of sufficient value to block the conduit 152 is applied to the coil 154. After the flow of developer has completely stopped, the amount of toner accumulated on the electrode 156 is sensed using a suitable photosensor.

In summary, it will be seen that the present invention overcomes the drawbacks of the prior art and provides the following, amount other advantages.

1. The developing ability of a powdered developer for electrostatography may be measured directly.

2. All sensing elements including a light source and photosensor are hermetically sealed against contamination by loose toner or dirt.

3. Attraction of toner to the electrodes and cleaning of the electrodes may be performed separately.

4. Compensating the photosensor output with a reference value which compensates for variations in the characteristics of the elements of the apparatus provides an extremely accurate measurement.

5. The electrodes may be arranged to simulate a line area of an electrostatic image for extremely accurate results.

6. The developing abilities of two toner components in a three component developer for two color electrostatographic reproduction may be measured separately and accurately.

Various modifications will become possible for those skilled in the art after receiving the teachings of the present disclosure without departing from the scope thereof. For example, the amount of toner accumulated on the electrodes may be photoelectrically measured using reflection rather than absorption as the parameter.

What is claimed is:

1. An apparatus for sensing a developing ability of a powdered developer for electrostatography, including an upstanding passageway through which the developer is caused to flow by gravity, attraction means disposed in the passageway for attracting the developer to the attraction means and sensor means for sensing an amount of developer attracted to the attraction means, characterized by comprising:

valve means disposed in the passageway above the attraction means;

aperture means disposed in the passageway below the attraction means for defining a restricted aperture; and control means for controlling the valve means to alternatingly open to allow developer to accumulate in the passageway from the aperture means upwardly above the attraction means while a restricted amount of developer flows downwardly through the aperture means; and close to allow the accumulated developer to flow downwardly below the attraction means; the control means controlling the sensor means to sense the amount of developer attracted to the attraction means after the accumulated developer has flowed downwardly below the attraction means.

2. An apparatus as in claim 1, in which the developer comprises carrier particles and toner particles, the attraction means attracting only the toner particles thereto.

3. An apparatus as in claim 1, in which the control means is constructed to de-energize the attraction means when the valve means is open and to energize the attraction means when the valve means is closed.

4. An apparatus as in claim 3, in which the control means is constructed to partially close the valve means after opening the valve means and before closing the valve means, the control means, while the valve means is partially closed, de-energizing the attraction means for a sufficient length of time to allow accumulated developer to flow downwardly below the attraction means and thereafter energizing the attraction means.

5. An apparatus as in claim 4, in which the developer comprises a ferromagnetic substance, the valve means comprising an electromagnet which, when energized, causes developer to adhere to a wall of the passageway, the control means energizing the electromagnet with direct current for closing the valve means and energizing the electromagnet with alternating current for partially closing the valve means.

6. An apparatus as in claim 1, in which the developer comprises a ferromagnetic substance, the valve means comprising an electromagnet which, when energized, attracts and causes developer to adhere to a wall of the passageway and block the passageway.

7. An apparatus as in claim 1, in which the developer comprises a first toner of a first color and a second toner of a second color, the first and second toners being charged to opposite electrostatic polarities, the attraction means comprising first and second electrodes and power source means for applying electric potentials of opposite polarities to the first and second electrodes respectively, the sensor means comprising first and second sensors for sensing amounts of toner attracted to the first and second electrodes respectively.

8. An apparatus as in claim 7, in which the first and second electrodes are transparent, the first sensor comprising a light source and a photosensor disposed on opposite sides of the first electrode respectively, the second sensor comprising a light source and a photosensor disposed on opposite sides of the second electrode respectively.

9. An apparatus as in claim 1, in which the attraction means comprises a transparent electrode, the sensor means comprising a light source and a photosensor disposed on opposite sides of the electrode respectively.

10. An apparatus as in claim 1, in which the attraction means comprises first and second parallel electrodes constituting a wall portion of the passageway, the second electrode comprising first and second vertically spaced and electrically separate section, and power source means for applying a first electric potential to the first electrode and first section of the second electrode and applying a second electric potential to the second section of the second electrode.

11. An apparatus as in claim 10, in which the first and second potentials are opposite in polarity.

12. An apparatus as in claim 10, in which the sensor means comprises a light source and photosensor, the first and second electrodes being transparent and disposed between the light source and photosensor such that light from the light source passes perpendicularly through the first electrode and second section of the second electrode and is incident on the photosensor.

13. An apparatus as in claim 1, in which the aperture means is constructed and controlled by the control means to close and define the restricted aperture when the valve means is open and to open and define an unrestricted aperture when the valve means is closed.

14. An apparatus as in claim 13, in which the developer comprises a ferromagnetic substance, the aperture means comprising an electromagnet which, when energized, causes developer to adhere to a wall of the passageway and partially block the passageway.

15. A method of sensing a developing ability of a powdered developer for electrostatography, comprising the steps of:

(a) providing an upstanding passageway, the developer being urged to flow through the passageway by gravity, attraction means disposed in the passageway for attracting the developer to the attraction means and sensor means for sensing an amount of developer attracted to the attraction means;

(b) opening the passageway above the attraction means and partially restricting the passageway below the attraction means to allow developer to accumulate in the passageway from the restriction upwardly above the attraction means;

(c) closing the passageway above the attraction means to allow the accumulated developer to flow downwardly below the attraction means; and (d) sensing the amount of developer atttracted to the attraction means.

16. A method as in claim 15, in which step (c) comprises opening the passageway below the attraction means.

17. A method as in claim 15, in which steps (a) to (d) comprise de-energizing the attraction means, the method further comprising the steps, performed after step (d), of:

(e) storing a first value indicating the amount of developer sensed in step (d);

(f) opening the passageway above and below the attraction means for a predetermined length of time while energizing the attraction means;

(g) closing the passageway above the attraction means;

(h) sensing the amount of developer attracted to the attraction means in step (f) to obtain a second value indicating the same; and (i) comparing the second value with the first value to obtain a third value which is a predetermined function of a difference between the second and first values.

18. A method as in claim 17, in which the sensor means comprises a light source and photosensor, the method further comprising the step, performed between steps (d) and (e), of:

(j) comparing an output of the photosensor with the first value; and (k) adjusting an intensity of the light source until the output of the photosensor is equal to the first value.

19. A method as in claim 17, further comprising the step, performed between steps (d) and (e), of:

(l) comparing an output of the sensor means with a reference value; and (m) obtaining the first value as a predetermined function of a difference between the output of the sensor means and the reference value.

* * * * *